US010257721B2

(12) United States Patent
Shackleton et al.

(10) Patent No.: US 10,257,721 B2
(45) Date of Patent: Apr. 9, 2019

(54) WIRELESS NETWORK CONFIGURATION

(71) Applicant: British Telecommunications Public Limited Company, London (GB)

(72) Inventors: Mark Shackleton, London (GB); Fabrice Saffre, London (GB); Anvar Tukmanov, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 3 days.

(21) Appl. No.: 15/562,189

(22) PCT Filed: Mar. 23, 2016

(86) PCT No.: PCT/EP2016/056353
§ 371 (c)(1),
(2) Date: Sep. 27, 2017

(87) PCT Pub. No.: WO2016/156142
PCT Pub. Date: Oct. 6, 2016

(65) Prior Publication Data
US 2018/0063726 A1 Mar. 1, 2018

(30) Foreign Application Priority Data
Mar. 31, 2015 (EP) .................................... 15275100

(51) Int. Cl.
*H04W 24/02* (2009.01)
*H04W 40/08* (2009.01)
(Continued)

(52) U.S. Cl.
CPC ........... *H04W 24/02* (2013.01); *H04W 4/029* (2018.02); *H04W 40/08* (2013.01); *H04W 52/34* (2013.01);
(Continued)

(58) Field of Classification Search
CPC ..... H04W 52/243; H04W 24/02; G06N 3/126
See application file for complete search history.

(56) References Cited

U.S. PATENT DOCUMENTS

2005/0227696 A1 10/2005 Kaplan et al.
2008/0002626 A1 1/2008 Yokoyama
(Continued)

FOREIGN PATENT DOCUMENTS

EP 2485516 * 1/2011 ............ H04W 52/32
EP 2618601 A1 7/2013

OTHER PUBLICATIONS

International Preliminary Report on Patentability for corresponding International Application No. PCT/EP2016/056353 dated Oct. 3, 2017; 7 pages.
(Continued)

*Primary Examiner* — Myron Wyche
(74) *Attorney, Agent, or Firm* — Amy M. Salmela; Patterson Thuente Pedersen, P.A.

(57) ABSTRACT

In a wireless network formed of short range femtocells, each femtocell provides wireless connectivity to user equipment devices and the user equipment can move around the topographical range covered by the network by handing over to a neighboring femtocell. Due to the limited range of a femtocell, there will be coverage gaps. If the device moves to a location not covered by a femtocell, it will try to connect to a macrocell of a different wide area cellular network until it is within range of another femtocell network. To minimize handovers from the femtocell network to the macrocell network, each femtocell is arranged to analyze historic log data to detect coverage gaps experienced by the user equipment as it moves along a user equipment route and try to close the gaps by increasing the coverage range of femtocells on either side of the coverage gap to close the gap.

13 Claims, 2 Drawing Sheets

(51) Int. Cl.
*H04W 4/029* (2018.01)
*H04W 52/34* (2009.01)
*H04W 36/00* (2009.01)
*H04W 88/08* (2009.01)
*H04W 52/36* (2009.01)
*H04W 36/04* (2009.01)
*H04W 84/04* (2009.01)

(52) U.S. Cl.
CPC ........ *H04W 36/0083* (2013.01); *H04W 36/04* (2013.01); *H04W 52/367* (2013.01); *H04W 84/045* (2013.01); *H04W 88/08* (2013.01); *Y02D 70/124* (2018.01); *Y02D 70/1262* (2018.01); *Y02D 70/164* (2018.01); *Y02D 70/22* (2018.01); *Y02D 70/324* (2018.01)

(56) References Cited

U.S. PATENT DOCUMENTS

| | | | |
|---|---|---|---|
| 2011/0244863 A1 | 10/2011 | Matsuo et al. | |
| 2012/0225628 A1* | 9/2012 | Ho | G06N 3/126 455/115.1 |
| 2012/0252453 A1* | 10/2012 | Nagaraja | H04W 52/243 455/436 |
| 2014/0328190 A1 | 11/2014 | Lord et al. | |
| 2015/0036663 A1 | 2/2015 | Kilpatrick, II et al. | |

OTHER PUBLICATIONS

International Search Report for corresponding International Application No. PCT/EP2016/056353 dated May 30, 2016; 3 pages.
Broadband Forum TR-169 EMS to NMS Interface Requirements for Access Nodes Supporting TR-101; Issue: 1.0; Issued Nov. 2008; 50 pages.
European Search Report for EP Application 15275100.4; dated Sep. 10, 2015; 8 pages.
Ho et al.; Evolving Femtocell Coverage Optimization Algorithms using Genetic Programming; Bell Laboratories, Alcatel-Lucent, Swindon, UK; 978-1-4244-5213-4/09/; IEEE 2009; 5 pages.
Han et al,; Evaluation of Authentication Signaling Loads in 3GPP LTE/SAE Networks; 2009 IEEE 34th Conference on Local Computer Networks (LCN 2009); Zürich, Switzerland; Oct. 20-23, 2009; 978-1-4244-4487-8/09/; 2009 IEEE; 8 pages.
3GPP TS 36.423 v12.1.0 (Mar. 2014); Technical Specification; 3rd Generation Partnership Project; Technical Specification Group Radio Access Network; Evolved Universal Terrestrial Radio Access Network (E-UTRAN); X2 application protocol (X2AP) (Release 12); 144 pages.

* cited by examiner

WIRELESS NETWORK CONFIGURATION

CROSS-REFERENCE TO RELATED APPLICATIONS

The present application is a National Phase entry of PCT Application No. PCT/EP2016/056353, filed on 23 Mar. 2016, which claims priority to EP Patent Application No. 15275100.4, filed on 31 Mar. 2015, which are hereby fully incorporated herein by reference.

TECHNICAL FIELD

This disclosure relates to apparatus, systems and methods relating to configuration of a wireless network such as a 3G or Long Term Evolution (LTE) network. Implementations and embodiments of the disclosure seek to improve coverage for user equipment (UE) within the network, by improving connections of UEs to base stations or access points (APs).

BACKGROUND

Historically, mobile/cellular networks have been centrally planned to achieve the majority of coverage via long range APs. New-generation networks conforming to the LTE (4G) standards and beyond are being widely deployed alongside 3G (and other legacy) wireless networks. In the present discussion, references to LTE and or wireless networks can include other wireless telecommunications networks as the context permits. All such networks are usually provided in the form of nationally deployed wireless APs known as macrocells, which provide regional coverage over longer range wireless links typically over tens of kilometers. Due to rapid and ongoing growth in demand for data capacities in wireless networks related to the increasing popularity of data-hungry applications on UEs such as laptop computers, smartphones, tablets and such devices (mobile or otherwise), alternatives models are being developed to share the data load. For example, data can be offloaded onto local, short range APs in the form small cell APs in preference to the longer-range macrocell APs. Such small cell APs operate links which transmit (and receive) over distances considerably smaller than macrocells, examples of which include femtocells, picocells, and microcells. In the present discussion, references to "femtocells" include other small cell network types.

These approaches helps relieve the traffic burden on macrocells and can provide a better user experience. Viewed in this way, macrocells are thought to be the primary network and short range APs are a secondary supporting resource. The range of femtocells typically spans distances of tens of meters. In this approach, there would typically comprise one or more femtocell networks within the footprint of a macrocell, and a user moving out of the range of a femtocell AP would expect to "fall back" to a connection with a macrocell AP.

It is known to provide for small cell networks in, e.g., densely populated areas (such as railway stations or concert venues) to meet permanent or temporary spikes in demand on a centrally-planned basis. However, femtocells were originally designed for residential and small business use, so femtocell APs are more commonly used in residential, and small and medium enterprise (SME) premises. They can be configured with the capacity to serve as LTE or LTE-compatible femtocell APs, which collectively between numerous homes and business endpoints can provide the femtocell network coverage and support discussed above by interworking with the macrocell LTE networks. This enables a UE within the wireless network to connect to the femtocell network instead of the macrocell network, allowing for data loads to be shared between the networks. The resulting increased bandwidth and capacity can result in an enhanced quality of service (QoS) and experience (QoE) for customers and users of UEs.

In certain cases, it may be preferred for UEs to connect to the femtocell network over the macrocell network (instead of the more conventional macrocell network providing the primary capacity with femtocells providing secondary, support to mop up spikes in demand). There are certain advantages, both technical and commercial, for such an approach. Where a femtocell network takes on most or even all of the local traffic within its footprint, there is no (or less of a) requirement for macrocell APs to "join up" the local coverage which in certain circumstances may be difficult or costly. The inversion of the usual approach could also reduce the level of connections transferring between macro- and femtocell networks, or repeated connection-flickering (known as "ping-pong") between the networks. Users would additionally benefit from choosing to remain connected to a particular network for technical or cost reasons, e.g., to avoid roaming charges to a fall-back macrocell network. For network operators or service providers, maintaining a connection on a particular network in preference to another allows improved control over network resources, to maintain consistency of quality standards and also allows for operational efficiencies. Commercial benefits could also be realized by keeping customers on the preferred network and avoiding interconnect charges. At the same time, residential and SME femtocells are by definition limited in power and have to be cost-efficient, so it will be an important part of a solution for these constraints to be taken into account.

In this alternative approach in which the femtocell network serves as the primary network, UEs within a femtocell network would have to be provided with end-to-end connectivity within the defined femtocell network footprint, especially when the users are actively mobile and travelling within the network. A problem arises owing to the potential for patchy connections due to lack of universal coverage within the femtocell network. As noted above, small cell APs were initially intended to provide local coverage or to serve as secondary coverage "infill" or data offload, in support of the primary planned macrocell network. Their ad hoc deployment by residential or SME customers is usually uncontrolled in the sense that a central network operator has no direct control over, or explicit knowledge of, coverage gaps in the femtocell network. For example, an end-user may choose to locate the hub in a part of the premises or in a way which impedes its transmission outside of the premises. A particular hub in the area may suffer an unexpected outage, or be turned off when the end-user goes on holiday. Such femtocell networks are, in this sense, "unplanned" (from the network operator's perspective), and so may not be relied upon to serve as a primary network—or even to support macrocell operations within an LTE wireless network. Such femtocell networks can be contrasted with macrocell networks, which are centrally planned and managed for wide-scale regional or national coverage. For femtocells to more usefully serve a role in the wireless access network, i.e. to take on part of the data load envisaged above, their usability has to be improved so that they can be better structured, located and controlled to provide a predictable and consistent level of coverage for UEs across a defined terrain. It would be desirable to be able to configure a wireless network to realize the above advantages and benefits.

A method in the area of handovers between femtocells and macrocells is described in EP 2485516, in which AP nodes are configured to independently assess the number of connections so that its transmission power can be increased to close coverage gaps. If and when it is determined that a user can be handed over to a neighboring node, the increased transmission power of the particular node is then reined back to drop the connection to that user. In a busy network with much UE movement and handover activity, it may be expected that the transmission power will require constant and continual adjustment, with the attendant risk of accidental connection drops. The described method provides secondary coverage for a network in which a macrocell is the primary data carrier, but does not provide a solution in which the femtocell network is to serve as the main network to which UEs preferentially connect especially when travelling within the area.

SUMMARY

According to a first aspect of the disclosure, there is provided a method of operating access points in a wireless network comprising identifying a user equipment route in the network, identifying at least two access points located along the user equipment route, determining that the coverage range of the two at least identified access points fail to overlap indicative of a coverage gap, and increasing the coverage range of at least one of the at least two identified access points.

A defining characteristic of an embodiment is that the way APs are operated is centered on UE behavior as manifested by the route taken by the UE, so that an increase in the coverage range between a pair of APs sited along a UE route is either made in anticipation of, or in response to, a UE travelling along the route. As will be elaborated below, implementations of embodiments can be directed to the total loss of connection between the UE and the (or any) network, or it can denote loss of connection within a coverage gap to a preferred network even if connection is maintained via an AP of a second network. In specific applications, coverage by a femtocell network is preferred over a macrocell network. Embodiments are directed to enable configuration of what is otherwise an unplanned network of femtocells (typically deployed in a residential or SME context) to support coverage of specific user trajectories and usage patterns. This is enabled by provision of a "coordination mechanism" between APs and UE that helps identify coverage gaps and to help reduce or completely bridge these gaps. In one implementation, all the coverage gaps along the UE route are identified and bridged (or at least spatially or operationally reduced).

In applications of embodiments, the coverage gap between two or more APs is decreased or bridged by increasing the power transmission of at least one AP so that the ranges output by all the APs overlap. A coverage corridor comprising a series of handovers forming a handover chain can be formed along all or part of the UE route within the network. The UE route can be known in advance (e.g. from historical data or by predictions premised on known information) which allows for corridors to be pre-provisioned on an anticipatory basis. Such corridors can be built ahead of time, or provisioned on a just-in-time basis for UE use. This approach can be adopted for purposes of network planning and designing on Day One. Alternatively, corridors can be built in a reactionary manner in real time, e.g. in response to a UE approaching a coverage gap along its route, or following an actual loss of connection to the (preferred) network. Corridors which are built can be made persistent (for later re-use), or else they can be dismantled by the APs reducing the power transmission levels e.g. when UEs have passed them on their routes.

Applications of embodiments also provide various methods to detect a coverage gap, as will be detailed below.

According to a second aspect of the disclosure, there is provided a method of configuring a network comprising a plurality of access points, each access point being configured to output a signal having an access range for connection to a user equipment and to hand over the connection to another access point as the user equipment travels within the wireless network, the method comprising: (i) identifying a location within the wireless network where the access range of the signal output by any of the access point is insufficient for connection with the user equipment, (ii) identifying one or more access point which are configured to output a signal within the vicinity of the identified location, (iii) increasing the access range of the signal output by at least one of identified access points so that the access range suffices for connection with the user equipment, and (iv) iterating (i) to (iii) as the user equipment travels within the wireless network.

According to a third aspect of the disclosure, there is provided a method for planning a network comprising a method according to the disclosure.

According to a further aspect of the disclosure, there is provided an access point in a network configured to increase its power transmission range in response to a handover request.

BRIEF DESCRIPTION OF THE DRAWINGS

Embodiments will now be described, by way of example only, with reference to the following drawings in which.

DETAILED DESCRIPTION

Embodiments and implementations of the disclosure are directed to the identification of coverage gaps in a femtocell network, which are then bridged or plugged. A defining characteristic of approaches of the invention is that the system is user- or UE-centric, and the network configuration is specifically or preferentially directed to providing coverage to UEs at their known or knowable locations and especially along the trajectories of their travel within the network. To enable this, a femtocell coverage "corridor" is generated to enable an unbroken link with the network along all or part of the route taken by UE(s). By seeking to configure the network according to typical user and UE behavior and usage patterns over time, the likelihood is increased that user equipment (UE) following a typical trajectory will be able to stay connected without dropping to another (less desirable) network. Connection to one network can be preferred over another for various reasons, such as quality of service, cost, capacity, or other factors mentioned previously. The skilled person would further appreciate that a network operator can, with suitable implementations of the invention, arbitrarily select certain APs to be a subset of preferred APs for UE connection for the above or any other reasons, including to prevent connection to them.

Such corridors can be formed from a series of handovers or a "handover chain" along the UE route, and so the formation of femtocell corridors is the same as forming handover chains across a number of identified femtocell APs in the known way using e.g. the X2 interface between eNodeBs in the LTE standard. In this way, the power range of the femtocell APs is enlarged along the corridor so that a moving UE can maintain an unbroken connection within the femtocell corridor along the trajectory identified by the system. In implementations of the invention, femtocell coverage corridors are formed so that connection can be extended to bridge coverage gaps (16) which fall outside the normal operating range of the femtocell APs in the area. The corridors are formed by configuring individual unplanned femtocell parameters according to aspects of the invention, which can be thought of as the formation of a network, the use of which can be coordinated and managed centrally.

Figure 1:
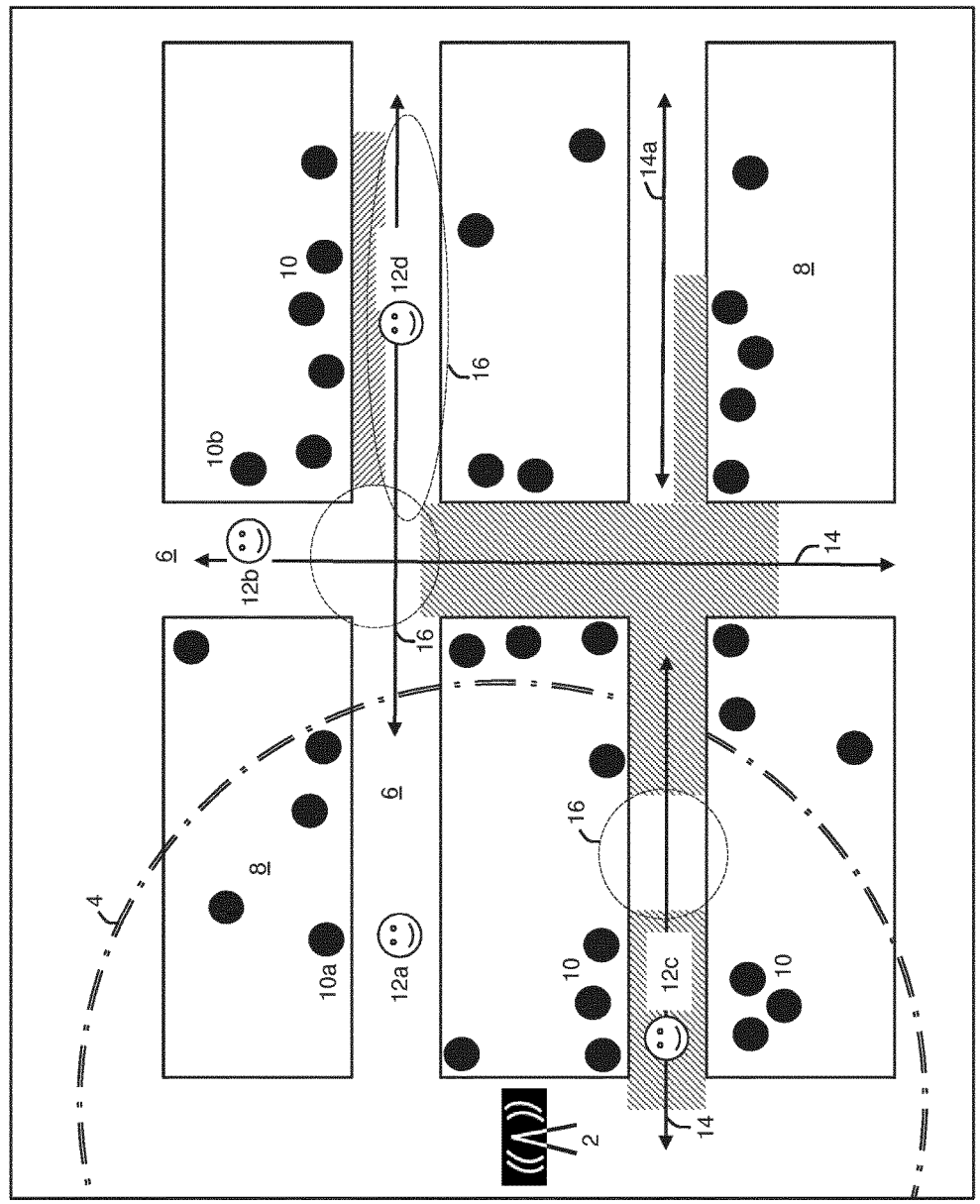
FIG. 1 is a topographical representation of an area which is partly served by a macrocell, and comprising a number of femtocell APs.

The following exemplary application of the invention is based on location of a UE in the two-dimensional topographical space depicted in the map of FIG. 1, as well its linear trajectory when moving within the area. A residential area is depicted, which is partly served by a longer-range or macrocell AP (2) providing LTE or similar longer-range wireless telecommunications coverage within the circular area defined within the dotted line (4) surrounding the macrocell AP. The area comprises a number of streets (6) which are laid out as shown, and regions or blocks (8) comprising residential and possibly small enterprise premises, located along the streets. A number of femtocell APs (10) are located at arbitrary positions within the blocks, and these are typically under the control of individual residential or SME end-users. UEs (12) carried by users are located on the streets, where they would be in a stationary position or travelling along on UE trajectories (arrows 14). In this description, a UE trajectory represents potential routes along which the user is or can be travelling (on foot or otherwise).

In a system relying on connectivity being provided only by the macrocell AP, a UE (12a) located on the street within the footprint of the macrocell network would typically be connected to the macrocell AP (2), while another UE (12b) located outside the footprint would have no connection at all (unless it has specific permission from a nearby femtocell AP e.g. (10b) to be connected to it). This restrictive use of an AP via a very limited set of pre-approved UEs is sometimes called "closed mode". Where the system is configured so that a femtocell network is additionally deployed to take on at least part of the data load, a UE (12b) outside the macrocell footprint but within the vicinity of a femtocell AP (10b) would be able to get a connection (even without formal permission from that AP), but if it moves out of range of that femtocell AP, connection will be lost. A UE (12a) within the macrocell range can connect to the macrocell AP (2) or a nearby femtocell AP (10a) operating in "open mode". A UE (12c, 12d) within the vicinity of a number of femtocell APs (10) whose transmission ranges overlap will be able to maintain connection via the femtocell network for the duration that it remains within the range along the trajectory (14). The areas having overlapping femtocell coverage are indicated by the shaded area in the street areas in FIG. 1. On some streets (e.g. the location of UE 12d) overlapping femtocell coverage is available on only one side of the street due to an absence of femtocell APs on the other side of the street, hence the other side of the street has a coverage gap (16). When the UE travels along its trajectory (14) out of range of the femtocell coverage (region 16), the connection will either fall back to the macrocell if this coverage is available (in the case of UE 12c), or else connection will be completely lost (in the case of UE 12d when it moves to the side of the street which has no overlapping femtocell coverage).

Figure 2:
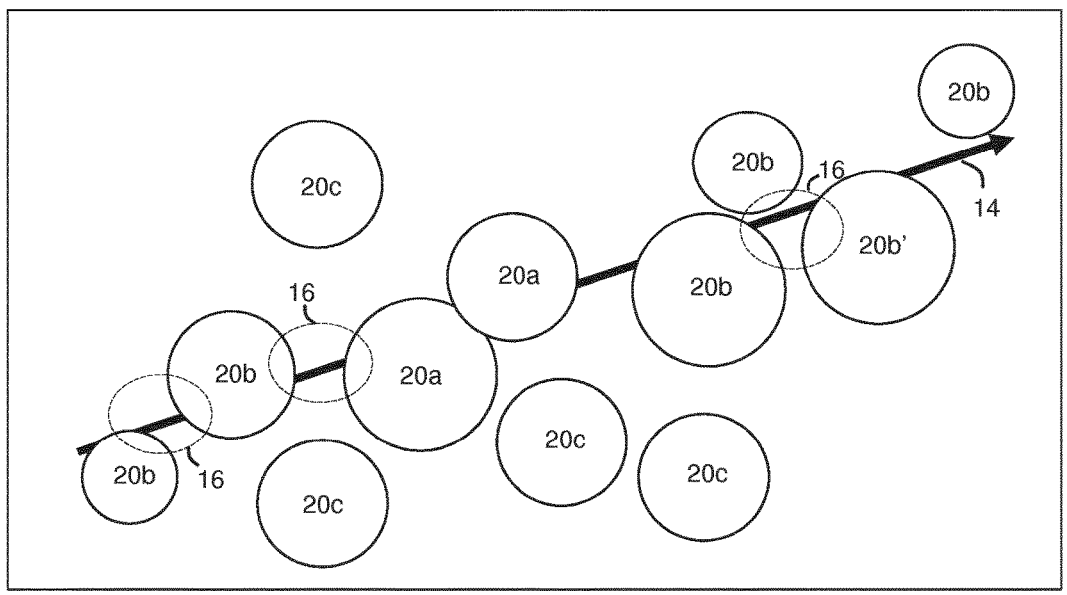
FIG. 2 is a schematic depiction of a UE trajectory through an area served by femtocells.

FIG. 2 is a schematic diagram of a UE trajectory (14) the route of which goes through a number of femtocell cells or ranges (20), before the formation of corridors. In some cases, two or more femtocell cells or APs (20a) are located or configured such that their ranges overlap so a UE signal and connection can be handed over without the need for a corridor. In other cases, cells or APs (20b) could be located or operated in a way so that their normal operational range does not overlap with those of their neighbors (20a, 20b, 20c). Where femtoranges fail to overlap, a coverage gap (16) is created, so a UE travelling along this trajectory will lose its femtocell connection (and fall back to the macrocell, if this is available) within the gap. The femtocells discussed above in this paragraph are "proximate" to the UE trajectory in the sense that they are located either actually on the UE trajectory, or sufficiently nearby so that their transmission ranges can be increased so that their reach can be extended to overlap with another femtocell AP along the UE route. Cells or APs (20c) within the vicinity may nonetheless be located so far from the UE trajectory that useful femto-range overlap along the trajectory is not possible even if the transmission range of that AP was increased to its fullest extent. Various mechanisms are known for increasing range, such as to increase AP power. Another method includes manipulating threshold parameters that are used to trigger handovers, so that an AP can "hang on" to connected UEs over a greater range than specified by default network settings (although there may be a penalty to this such as accepting a lower signal quality as a consequence). The terms "range" and "power" should be taken to have this broader interpretation of including parameter changes that provide an "effective" range change. The skilled person would also appreciate that the circular coverage is a simplification that made only for present illustration purposes. In practice, a coverage area can be asymmetrical, which bears the possibility of extending it in just one particular direction to plug a gap in femto-coverage.

It is a feature of implementations of the disclosure that femtocell APs and their extended transmission ranges are identified in terms of their proximity to a UE trajectory. Hence, such proximate APs (20a, 20b) can be contrasted to those (20c) which are remote (i.e. not "proximate") from the UE trajectory in the sense that they are either physically so far from the identified route (14) taken by the UE, or else they are incapable of being configured to increase their power transmission range to overlap with another AP to provide a bridge over a coverage gap (16). The system is therefore UE-centric in terms of how and which femtocells APs are configured to set up the coverage corridors.

Figure 3:
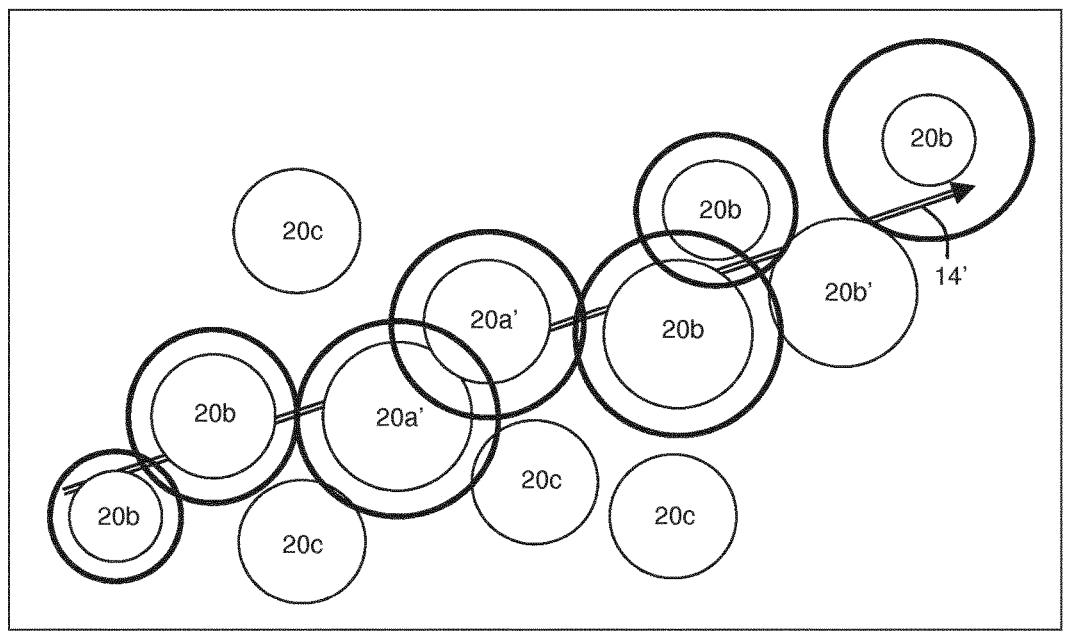
FIG. 3 is a schematic depiction of a UE trajectory through an area served by femtocells according to an embodiment.

Turning now to FIG. 3, this depicts the formation of a coverage corridor (14') for the trajectory shown in FIG. 2 provided by an implementation of the disclosure, which results in the UE maintaining an uninterrupted connection to the extended femtocell network via seamless handovers between the APs which are located on or proximate to the trajectory. The extended transmission ranges of those femtocell APs which have been reconfigured to collectively form the coverage corridor are depicted in the form of concentric circles surrounding the original (pre-corridor) transmission range in the drawing. It can be seen from the example shown in FIG. 3 that all the APs along the UE trajectory have been reconfigured to form the corridor—save for AP (20b') which need not be reconfigured because the range of its reconfigured neighboring APs (20b) suffice to overlap with it. It might also be noted that the two APs the ranges of which do overlap with each other even during normal (pre-corridor) operation have also been reconfigured in order to bridge the coverage gap with their neighbors on either side. In contrast, there is no need to reconfigure those femtocell APs (20c) which are deemed to be remote from the UE trajectory. It is further noted that APs are not conventionally configured to ramp-up power in response to a handover request.

A femtocell coverage corridor generated according to applications of the disclosure can extend coverage at an acceptable QoE to users who might otherwise suffer a complete lack of connectivity, as illustrated by the trajectory of a UE (12b) in FIG. 1. It may also be desirable to preferentially choose a femtocell network as the primary network versus the macrocell where possible, as for UE (12c) on FIG. 1.

The creation of relatively narrow, elongated corridors of coverage which reflect the underlying movement or trajectory of UEs, can result in classification of APs in dependence on whether they are co-opted into the formation of the corridor by extending their power range (e.g. cells (20a) and (20b) in contrast with cells (20c) in FIGS. 2 and 3). A network operator could adopt a policy which specifies that different parameters could be acceptable for different classes of cells, e.g. where a lower QoS than average is acceptable for cell types (20b) which needs to extend its power range to bridge gap (16) obtain an overlap to enable a handover from another cell (20b). Other configurations or parameters can be envisaged for application to one cell type or class over another.

There are various ways in which gaps are identified and bridged, and a number of approaches are known from techniques for designing and planning macrocell networks. For example, offline optimization techniques using models and simulations of coverage can be run to look for areas of poor coverage. Gaps in already-deployed networks can also be detected this way, or else by performing a "drive test" in which coverage detection equipment is driven around a given area to test coverage. During operation, the LTE standard also implicitly captures evidence of coverage gaps by having UEs record radio link failures and then report back on these to the network via APs once reconnected later. Such failures would be expected to occur as a UE moves out of coverage of an AP, with no alternative to handout to. To address coverage gaps, typical responses involve the addition of more AP towers, aiming coverage appropriately from towers, adjusting tilt, power, including offline optimization and real-world measurements, to maximize coverage and QoS, and to minimize interference, etc., in the macrocell network across a region. While such known methods can also be used in the implementations of the disclosure, some other approaches in respect of the formation of femtocell coverage corridors for continued UE connection will now be considered in some detail.

A "Spatial Coverage" Approach

This solution requires knowledge of spatial arrangement of APs (e.g., in the form of a map such as that of FIG. 1, or over a geometric space such as depicted in FIG. 2) in order to identify and bridge coverage gaps, and takes the following assumed or known inputs:

The location of femtocell APs and their coverage range

A UE trajectory within the network (e.g. all or segments of routes defined by pedestrian pavements, roads, bus routes)

This method uses information about the APs and trajectories which are already known as actual data or else are assumptions or projections. Such information can come or be derived from historic data in the form of prior analysis of typical UE movements over a period of time, road maps, network operator records, and so on. As a specific example in the UK, it is a statutory requirement for low-powered femtocells locations to be recorded by network operators at postcode-level accuracy, while the location of more powerful cells are known with even greater precision. Some devices are likely to be able to provide global positioning system (GPS) coordinates, which would provide greater accuracy than a postcode.

The process starts with identifying those APs that are "proximate" to the UE trajectory (20a and 20b in the examples of FIGS. 2 and 3) in the sense discussed above, so that they are within the maximum power range of the trajectory. "Remote" femtocell APs (20c) are ignored in this analysis. The identified APs are ranked based on distance from the trajectory line (the closest first) and included on a "contender list". The distance between each AP on the contender list and the center (or other) point of an identified coverage gap (16) along the trajectory is calculated, and the APs having a power range equal or greater than this distance are included into a "bridges list" (which ranks APs that might help bridge a gap according to shortest distance first). If the bridges list is not empty then its first element (i.e., the AP nearest the center point of the gap) is denoted as a "bridge AP", and its range (power) is adjusted according to conventional methods, such that its coverage encompasses the entire gap segment. If this fails to close the entire gap, then the power of the bridge AP is set to its maximum value, which can be reduced when a suitable level of overlap has been established, for example if a nearby AP has similarly had its range (power) increased. In an implementation, successive APs along the trajectory are arranged to collaborate by first setting their ranges to maximum, then relaxing the system to find an efficient solution. If the bridges list is empty for a given gap then it is noted that that particular gap cannot be bridged and when it is determined that none of the remaining gaps can be bridged, the process stops.

This method is based on a simplified view of APs and assumes a circular coverage range. It can be useful in providing a quick and good-enough first assessments and proposals in connection with setting up corridors, and can be modified to take into account real-world considerations such as:

Range: the simplest view is as a radius of a coverage circle (disc) centered on the access point. In practice real-world coverage will be a less regular region affected by obstacles etc. Effective range can be increased by increased power output, but also by "hanging onto" UEs by changing handover "trigger thresholds" such as minimum acceptable received power at UE.

Coverage: closely related to the concept of range above, coverage in reality is the zone over which an AP's signal is sufficient for a UE to successfully use it, and will typically be an irregular shape. The extent of the coverage region for a higher "range" will be larger than the coverage region for a lower "range" value.

Methods are known for the collection of the necessary data from femtocells for this purpose: for example, the TR-169 data model ("EMS to NMS Interface Requirements for Access Nodes Supporting TR-101") issued by the Broadband Forum specifies fields that can be used to collect required information from the femtocell, such as FAPService.{i}.CellConfig.LTE.RAN.RF.Reference SignalPower which together with other parameters can be used to derive the maximal transmit power to serve as inputs for the process according to this approach. In operation, an overview of multiple APs will be required for the corridor formation, so it would be preferable to control the process and to run the logic at a centralized location capable of decision-making such as an Operations Administration and Management (OAM) node ideally in the fixed network to which the APs are connected via backhaul links.

The following pseudocode outlines the logic which may be run at the OAM to set up corridors according to applications of the disclosure:

---

```
For each provided trajectory, specified via its two-dimensional geographic
start and end points
  initialize APs in model to their default range and power settings
  gaps = find_gaps( start, end )    // walks along the trajectory
recording every gap segment without coverage
  if gaps list is empty then exit with no further action, else continue
initialize contenders list to null
Foreach AP
    If distance_to_trajectory ( AP, trajectory ) < AP.range Then
        insert AP into contenders list, in increasing distance order
if contenders list is empty then exit with no further action, else continue
Foreach gap in gaps list
    Initialize bridges list to null
    Foreach contender in contenders list
        If  distance_between(  contender.location,
gap.midlocation  )  < contender.maxrange Then
            insert contender into bridges list,
in increasing distance order
    fully_bridged = FALSE
    while (bridges list is not null and not fully_bridged)
        set bridge = bridges [0] and remove this item from bridges
        list
        bridge.range = bridge.maxrange
        If distance_between( gap.end1, bridge.location ) <
            bridge.range and distance_between( gap.end2,
bridge.location  )  < bridge.range ) Then
                fully_bridged = TRUE
```

---

In an application of this technique, each coverage gap could be addressed recursively, for example, starting with larger gaps and subdividing these to achieve coverage.

The skilled person would appreciate that there are alternative ways of achieving coverage by setting up corridors according to this approach within the scope of the disclosure. For example, the contender list could be ordered according to increasing distance from the start point of the trajectory (i.e., how far along the trajectory they are), set all of their ranges to maximum, and then run a "relaxation" stage where ranges are collaboratively reduced between neighboring APs in a more decentralized fashion, whilst still maintaining coverage of erstwhile gaps. It should also be noted that a femtocell may be performing several optimizations that attempt to adjust, or limit the range of, parameters that affect range. Adjustments described here could also take such limitations into account when trying to resolve gaps.

An "AP History" Based Approach

This approach does not require explicit knowledge of spatial arrangement of APs in order to identify and bridge coverage gaps. Instead, the solution views the task as being to bridge gaps along a trajectory in the form of a chain of APs, by manipulating AP parameters. Optionally, a reduction in QoS or signal strength could be accepted to achieve the bridging of the corridor across the coverage gap. This approach is simpler and is less complex and has less computational overhead when compared to the above-described spatial method, with no need for explicit geographical location information. It is based on and an application of known techniques such as "mobility prediction" which use Markov chains/models and/or past sequences to predict the next AP along the UE trajectory, based on historical UE movements and AP affiliations.

Specifically, the approach uses a set of historical AP data representing the sequence of APs visited by a UE over time, and assumes or requires that UEs retain a "historical list" which sequentially sets out the last n APs that it has previously been connected to. In an example, n=16, and the particular UE's historical list includes femtocell APs as well as macrocell APs (where the UE had dropped out of the femtocell range). In this case a subset of the AP sequence is {A, B, C, M, D, E, F} where M denotes a macrocell AP and the remaining letters denote femtocell APs. In this case the progression C→M→D denotes a coverage gap in the femtocell network between nodes (i.e. APs) C and D. By requesting and obtaining from a UE its historical list, it will be possible to identify gap femtocell AP pairs, such as {C, D} above. The femtocell network is then reconfigured to bridge these gaps where possible, by carrying out a coordinated action between the AP pair {C, D} and the UE. The APs are arranged so that when e.g. AP C detects that a UE is approaching the limits of C's coverage, then for each previously identified gap pair {C, $D_i$}, it successively looks for an opportunity to bridge the gap to $D_i$. AP C first instructs (each) $D_i$ to increase its range (power) and also asks the UE to listen for that $D_i$. Where the UE detects $D_i$ this is then recorded as a neighbor relation for C. An analogous way to achieve the same effect would be to add each $D_i$ to the potential neighbor relationship table of C, regardless of prior detection, to promote attempts to connect to $D_i$ by that means. However if after a reasonable time $D_i$ has not been detected then it would be dropped from the neighbor table. In the event that an identified gap pair {C, D} arising from the C→M→D sequence is unbridgeable perhaps due to APs C and D being not proximate to each other (i.e. being located too far apart), then in such cases the above bridging approach will simply fail, and the process ends there. For the UE, this means that its connection will drop within the unbridgeable gap and potentially be picked up by the macrocell AP if this is available. However, other sections along the trajectory may be successfully bridged, leading to the formation of corridors over at least part of the UE route.

In contrast with the spatial coverage model, the processing and storage to carry out the steps in this approach is preferably run at each local femtocell AP in a decentralized configuration. If the AP is kept simple however and incapable of running the logic, then the processes could be delegated back into a centralized node, but this would not be the most efficient approach.

The following pseudocode outlines the logic which may be run at an AP to set up a coverage corridor according to the history-based application of the disclosure. To reiterate, each femtocell H (the home AP) needs to maintain a list hroutes of historical routes that UEs (currently visiting H) have taken, with each route of the form { . . . A, B, M, C, H} where H denotes home (i.e. the local AP) and . . . A, B . . . denote earlier femtocell APs within a particular route. Here, the route includes macrocell AP M, e.g. { . . . , B, M, C, . . . } above denotes hand-out to a macrocell from B and hand-back to femtocell C.

```
Initialize hroutes to null
Repeat at a predetermined interval...
  Foreach UE currently hosted at the local AP "H"
    If UE sequence data for current visit is not already contained in hroutes
    Then
        Instruct UE to report its history as a time-ordered sequence
of APs which have hosted it, inc. "H" last
        Wait for reply or timeout
        If reply received Then add the UE-reported sequence to the
        hroutes list
  Initialize gap_pairs list to null
  Foreach sequence hroute in hroutes
    Foreach triplet subsequence {X,M,Y} that hroute contains  // i.e.
containing a macrocell hand-out-then-in
        Add the pair {X,Y} to the gap_pairs list
  Foreach gap_pair {X,Y} in the gap_pairs list
    Send notification message to AP X informing it that Y is a potential
hand-out neighbor
    Send notification message to AP Y informing it that X is a potential
hand-out neighbor
  Listen for incoming notification messages from other APs, via the
fixed network, for a timeout period
    Foreach notification of potential neighbor received
      try_bridge_to_neighbor (neighbor)
```

Two ways of attempting to bridge the gap are set out below as try_bridge_to_neighbor (neighbor). Either or both techniques can be used separately or successively. In this connection, the femtocell H (the home AP) needs to also maintain the following information:

A list of neighbors which a UE could be handed-out to, and

A list of neighbor_candidates which could possibly also become neighbors, initialized to null.

(1)

try_bridge_to_neighbor_add_it(X) // i.e. simply add it, so that it will later be sought for hand-out
  If X is not already in the neighbors list Then
    Add X to the neighbors list (2)

try_bridge_to_neighbor_coordinated(X) // i.e. add it as a potential neighbor
  If X is not already in the neighbors list and X is not already in the neighbor_candidates list Then
    Add X to the neighbor_candidates list
handout_trigger(UE) // invoked when a UE hosted on the current femtocell "H"
requires hand-out, e.g. UE is losing AP coverage
  Instruct UE to report list of detected femtocell APs which exceed a minimum signal power threshold
  For each candidate in neighbor_candidates list // try to add bridges to additional femtocells
    Send notification to candidate via fixed network to increase its range to its maximum value
    Tell UE to listen for candidate and report back measurement
    If UE detects candidate Then
      Add candidate to detected list
  If detected list is not empty Then
    Select hand-out target AP from detected femtocell list // e.g. based on strongest signal power
  Else
    Select hand-out macrocell AP, if available In an implementation of this technique where some estimate of location of the "gap neighbors" is available, the distance between them could be determined and those that exceed a threshold distance could be eliminated from consideration to avoid seeking to bridge implausibly large gaps.

The above code illustrates how implementations of the disclosure can enable the building of corridors in a reactive way (i.e., in real time, in response to, e.g., detecting a UE trajectory being formed along a path which includes coverage gaps), or a pre-emptive manner. In the above code, try_bridge_to_neighbor_coordinated( ) maintains and grows the neighbor_candidates list as and when UEs report back their respective histories, but the actual bridging in this case happens within handout_trigger( ) when it is invoked for a UE, such as when a UE hosted on the current home femtocell AP is losing coverage. An example of a pre-provisioned bridge can be seen from try_bridge_to_neighbor_add_it( ) for which the neighbor list is manipulated by simply adding possible extra neighbors.

The skilled person would appreciate that alternative ways to implement this history-based approach within the scope of the disclosure are possible. For example, AP M in the C→M→D sequence can be detected as being a different neighbor type from the femtocell APs C and D on account of M being an inter-frequency neighbor to C and D. Specifically in the LTE context, the cell type can also be inferred from the UE's history information message (which is specified in 3GPP TS36.423 as a mandatory X2AP message and includes up to 16 last visited cells (not necessarily LTE) with information about cell ID, type, and time spent on the cell). Here, a UE performs two successive handovers (C to M and M to D), D will learn that the UE has travelled from C through M, and that there is a femtocell coverage gap filled by M. D will also know from the UE history message the time spent on each of the cells (C and M). Repetitions of this message from other UEs can trigger a local algorithm to identify the gap between C and D and attempt to close it, e.g. in the manner specified in the above pseudocode. A shorter time spent on M indicates a higher chance of closing the gap with relatively small power boost at C and D. Described power boost (total or just on some Resource Blocks) at C and D can be decided locally and individually at C and D or after negotiation over X2 (X2 should be established according to known technique between C and D as they are not neighbors yet). In any case, such a change will be communicated to all UEs via a RRC reconfiguration message. In the case of collaborative power change to close the gap, the contents of the X2 AP Load Information message can be utilized. In particular a change in the Relative Narrowband Transmit Power field can be used to send new power setting/allocation D to C after running an algorithm along the lines of the above pseudocode. AP C should not normally back-off power after D's power boost as C and D do not have overlapping coverage areas, so as to achieve the range overlap needed to close the coverage gap between the APs.

As would be apparent to the skilled person, it would be possible to combine all or some elements of each of the above techniques to obtain more accurate results or to achieve them in a more efficient manner. Regardless of the exact approach adopted however, it is desirable for the femtocell network to be relatively stable during use, i.e., to avoid highly dynamic reconfiguration. The logic used to implement the above approaches preferably includes incorporating an element of hysteresis to help maintain operational stability. A self-organized (i.e., locally coordinated) approach to coverage could be used between neighbor to seek to minimize range (power) of individual APs whilst still being sufficient to form corridors. An advantage of inferring gaps in this way is that it is computationally relatively simple and can be handled locally at an AP without signaling overhead. Evidence could also be built up over time on gaps that recur for more than one UE.

A "Network Planning" Approach

Use of the above two approaches to identify gaps and set up femtocell coverage corridors will improve unbroken UE connection to the femtocell network, but it is likely that some gaps in the femtocell coverage corridors will exist along at least some of the UE trajectories.

In some cases, the lack of bridged coverage for a UE may be temporary in nature, e.g. while the bridge is being built over a gap. For e.g. asynchronous data transfers, this temporary loss of connection may be acceptable as the data can be cached and the transfer may tolerate a wait-to-transmit approach which can bridge "gaps in time" (until next reconnected). Even minimizing the gaps (but not removing them altogether) can help with such an approach. Similarly non-real-time services such as message notifications could potentially wait for delivery during a gap interval. Minimizing gaps would however help minimize the wait delay, which could benefit user quality of experience.

The inability to bridge a coverage gap may be permanent in nature where the density and location of femtocell APs may in a particular area be insufficient to generate a corridor, owing to the limits to which power or range of a particular AP can be extended. Femtocells and other small cells are by definition particularly limited in their transmission range. Referring to the map of FIG. 1 as an example, femtocells (10) are thickly clustered only in some areas, while there are few or none in some other blocks (8). Where femtocell coverage is not available, a UE will be connected via the macrocell if within range (e.g. UE 12a), while another UE outside the macrocell footprint will simply not have any connection at all (UE12b). Accordingly, a popular user route in the area may be completely under- or un-served for having no coverage by a femtocell network in the form of overlapping femtoranges nor a corridor. In the worst case scenario, such a UE trajectory (e.g. 14a) also lies outside the macrocell footprint, so that the users have no connection at all.

It would be useful to take into consideration such inconsistent placement of femtocell APs in a process at the network planning stage. Based on actual and/or predicted information about the location and power of femtocell APs that will be deployed by customers within a given area, a central body such as a network operator or a service provider can add an element of "central planning" to what will be an unplanned network, to provide a service that better matches UE usage and travel patterns. According to this aspect of the disclosure, trajectories are initially identified. Potential coverage gaps along the trajectories are then identified using any of the above-described techniques, and the results fed into a network planning tool which finds the location of a new AP to be deployed for what might be the sole purpose of bridging the gap along the identified trajectory. Such a deliberately provisioned small cell AP(s) would be located along an identified trajectory at a place which enables the AP to address the coverage gap. An AP could be installed outside customer premises (e.g., on the street), or else attached to or be located within customer premises (with the necessary customer permissions). A coverage corridor can be optionally formed using this newly-provisioned AP in the manner described, wherein the neighboring APs may be either existing "unplanned" APs, or which are also "centrally planned" APs.

A similar approach may be taken to "retrofit" existing networks (which are past the planning stage), to identify gaps which may be plugged by deliberate centrally-planned provision of an AP which can be used to form corridors with neighboring APs. The skilled person would appreciate that yet other approaches within the scope of the invention are possible in which, for example, end customers could be requested by the network operator or service providers to place their APs in specific places to bridge coverage gaps which could enable corridors to be set up.

As noted above, embodiments have application in a variety of contexts to be used in different wireless network types and standards. As might be expected, detecting gaps in coverage and setting up corridors would be handled differently in different systems. In a LTE network for example, protocols and signaling methods for femtocells to collaboratively adjust coverage between them associated with Self Organizing Networks (SONs) can be exploited (although SON mechanisms merely provides standards, in which the actual processes are not defined). Prior to commencement of operation of the network, the following SON capabilities could be particularly relevant:

Automatic Neighborhood Detection function
OAM defined Neighbor Relations (addition & removal)
"No remove" and "no handover" parameters, per neighbor During operation, the SON self-optimization function can enable:

Mobility Load Balancing
Load Info exchanged between neighbors (over X2)
Handover and/or Reselection configuration
Handover Trigger threshold
Mobility Robustness Optimization
Radio Link Failure messages
Too early/late or Wrong Cell handover events
Handover Reports
UE Context Release messages In implementations of the disclosure, coverage corridors can be set up proactively in anticipation of demand, or more dynamically, e.g., in response to demand. An example of proactive creation of corridors is where common trajectories have been established along a route that is known to always or usually be busy, so a long-lived corridor would be useful to provide consistent coverage. This can be generated on, e.g., Day One at a network design phase, or at a later time during operation of the network. Such a corridor can be configured to persist where it can usefully provide coverage in a location with a known coverage gap. Alternatively, it can be built and "torn down" in situations where UE traffic patterns are known to change significantly over the course of a day, e.g., when a route is busy on weekdays at rush hour but is quiet at all other times, so that it is inefficient, or counterproductive for reasons of interference management, to increase the power of multiple APs so as to facilitate formation of corridors that are then poorly utilized. In this case it may be appropriate to seek to form corridors only during specific periods of time, or in response to a detected minimum and growing level of usage and then dismantle the corridors by letting APs revert to their default behavior (and parameter settings) at other times. A more dynamic situation can comprise a scenario where corridors are created on-the-fly in response to detected changes in UE traffic volumes and/or movements. The skilled person would appreciate that the bridging of a coverage gap can be dismantled when they are no longer required.

The apparatus, methods and configurations described above and in the drawings are for ease of description only and not meant to restrict the scope of the disclosure to any particular embodiment. For example, coverage corridors can be generated for any kind of network in preference to another, say in the case where one service provider wishes to carve out or to tunnel through another service provider's network. The above description sets out the disclosure in the context of one (or more) preferred network(s) over another (s) so that in the conventional sense, a connection has not been dropped or lost as the connection has merely been handed back to a macrocell owing to a gap in the femtocell network. Nonetheless, the skilled person would appreciate that implementations of embodiments of the disclosure can be equally applied to situations in which only a single network has been deployed, e.g., a macrocell or smaller cell network without any secondary network to hand connections off to. In such a case (as depicted in FIG. 1 by the position of UE (12b)), a connection will be entirely lost if the UE moves out of range of an AP of whichever type; embodiments can be applied to detect on a reactive or pre-emptive basis the coverage gap and to bridge the same if possible.

The invention claimed is:

1. A method of operating access points in a wireless network comprising:
   i) identifying a user equipment route in the wireless network, the user equipment route relating to a trajectory of at least one user equipment through a topographical area covered by the wireless network, by processing a historic log recorded by at least one user equipment relating to previously connected access points in the network;
   ii) identifying, without user intervention and by at least one access point, at least one coverage gap within the identified user equipment route by locating events in the historic log relating to disconnections from the wireless network between at least two access points; and
   iii) closing the at least one coverage gap by increasing a coverage range of at least one of the at least two identified access points so that coverage ranges of the at least two access points overlap.

2. A method according to claim 1 wherein ii) and iii) are repeated for all identified coverage gaps in the user equipment route to form a corridor of increased access to the wireless network.

3. A method according to claim 1, wherein at least one coverage gap is identified from a handover between access points in the wireless network and devices forming part of a second wireless network.

4. A method according to claim 1, wherein the coverage range is increased by increasing transmission power.

5. A method according to claim 1, wherein the coverage range is increased by reducing handover threshold values.

6. A method according to claim 1, wherein an amount of time in which the at least one user equipment is disconnected from the wireless network between connection to access points of the wireless network is contained in the historic log and used to determine a probability for successfully closing the coverage gap.

7. A method according to claim 1, wherein increasing the coverage range to close the coverage gaps is performed dynamically in accordance with network utilization conditions.

8. A method according to claim 1, wherein the coverage range of at least one of the at least two identified access points is increased in response to a handover request associated with the at least one user equipment so that the coverage gap is closed.

9. A method according to claim 6, further comprising decreasing the coverage range of at least one of the at least two identified access points after the coverage range has been increased.

10. A method according to claim 1, wherein the access points are cellular network femtocells and the user equipment are configured to access both the cellular network femtocells of the wireless network and macrocells of a second wireless network, the femtocells having a smaller coverage range than the macrocells and the user equipment being arranged to connect to another femtocell in preference to a macrocell.

11. A wireless network comprising a plurality of access points and operating in accordance with the method of claim 1.

12. An access point in a wireless network for providing network connectivity to at least one user equipment over a coverage range, comprising:
   a transceiver to communicate with at least one user equipment device containing a historic log relating to previously connected access points in the wireless network; and
   a processor to:
      process the historic log to identify, without user intervention, at least one coverage gap experienced by the user equipment, and
      cause the access point to increase a coverage range in order to close an identified coverage gap.

13. An access point according to claim 12, wherein the access point is a femtocell operating in a Long Term Evolution cellular data network.

* * * * *

UNITED STATES PATENT AND TRADEMARK OFFICE
CERTIFICATE OF CORRECTION

PATENT NO. : 10,257,721 B2
APPLICATION NO. : 15/562189
DATED : April 9, 2019
INVENTOR(S) : Shackleton et al.

Page 1 of 1

It is certified that error appears in the above-identified patent and that said Letters Patent is hereby corrected as shown below:

In the Specification

In Column no: 1, Line(s) no: 29, delete "and or" and insert -- and/or --
In Column no: 1, Line(s) no: 39, delete "alternatives" and insert -- alternative --
In Column no: 9, Line(s) no: 24, delete "Foreach" and insert -- For each --
In Column no: 9, Line(s) no: 28, delete "Foreach" and insert -- For each --
In Column no: 9, Line(s) no: 30, delete "Foreach" and insert -- For each --
In Column no: 11, Line(s) no: 3, delete "Foreach" and insert -- For each --
In Column no: 11, Line(s) no: 10, delete "Foreach" and insert -- For each --
In Column no: 11, Line(s) no: 11, delete "Foreach" and insert -- For each --
In Column no: 11, Line(s) no: 14, delete "Foreach" and insert -- For each --
In Column no: 11, Line(s) no: 20, delete "Foreach" and insert -- For each --
In Column no: 13, Line(s) no: 31, delete "(UE12b)" and insert -- (UE 12b) --
In Column no: 14, Line(s) no: 10, delete "a LTE" and insert -- an LTE --

Signed and Sealed this
Fifteenth Day of October, 2019

Andrei Iancu
*Director of the United States Patent and Trademark Office*